United States Patent [19]

Hinks

[11] Patent Number: 4,502,857
[45] Date of Patent: Mar. 5, 1985

[54] GREEN TIRE-TO-MOLD CONTACT TIME DETECTION, ANALYSIS, AND CONTROL

[75] Inventor: William L. Hinks, Akron, Ohio

[73] Assignee: The Goodyear Tire & Rubber Company, Akron, Ohio

[21] Appl. No.: 482,111

[22] Filed: Apr. 4, 1983

[51] Int. Cl.³ ............................................. B29H 17/00
[52] U.S. Cl. ........................................ 425/29; 425/33; 425/140; 425/144; 425/149; 425/160
[58] Field of Search ..................... 425/29, 30, 33, 140, 425/144, 147, 149, 150, 160; 156/130.5, 394.1, 421.2

[56] References Cited

U.S. PATENT DOCUMENTS 2,556,593  6/1951  McDonald ............................ 425/29
3,718,721  2/1973  Gould et al. .......................... 425/29
3,859,015  1/1975  O'Brien ................................ 425/29
4,115,046  9/1978  Smith et al. .......................... 425/29

Primary Examiner—Caleb Weston
Attorney, Agent, or Firm—T. P. Lewandowski

[57] ABSTRACT

The mold halves of a tire press are provided with sensors which determine the contact times of a green tire at certain points on the mold surfaces. The timing so obtained is processed by a microprocessor to determine the run-out profile of the tire. The data is further used for determining the average gap between the green tire and the mold surfaces both at the time of mold closure and at the time of first contact between the green tire and the mold surfaces. This data is then used to regulate the closure rate of the mold halves and/or the inflation rate of the green tire. The sensors contemplated include pressure switches, vacuum switches, microswitches, linear variable differential transformers, and thermocouples.

17 Claims, 7 Drawing Figures

GREEN TIRE-TO-MOLD CONTACT TIME DETECTION, ANALYSIS, AND CONTROL

TECHNICAL FIELD

The invention herein resides in the art of tire-making apparatus and techniques. More particularly, it relates to an apparatus and technique for measuring the run-out curve of a tire as the same is being shaped in a tire press. Specifically, the invention relates to an apparatus and technique for sensing the relationship between tire mold closure and the tire-to-mold contact time, for allowing an operator to determine the run-out curve of the tire and to further make adjustments as to closure rate and mold contact time.

BACKGROUND ART

In the manufacture of tires, increasing concern is given to lateral and radial force variations existing within the tire. It has been determined that lateral and radial run-out problems or "out of round" problems develop, to a large extent, in the tire press. As is known in the art, a green tire is placed within the tire press or mold and the press is closed as a bladder inflates the green tire and forcefully moves the green tire into contact with the hot tread mold. The inflated green tire is maintained within the press for a period of time sufficient to allow the rubber of the tire to be cured at high temperatures. The tread and outline shape are formed on the tire during the first part of this period.

It is most preferably that the bladder move the green tire into contact with the mold contemporaneous with closure of the mold. It has been found that if certain areas of the tire contact the mold before others, force variation problems may result with the tire. Further, if the tire has contacted the mold prior to mold closure, force variation problems may become existent within the tire. Accordingly, it is most preferable that the green tire expand radially at a uniform rate about the circumference of the tire such that mold contact be substantially instantaneously achieved about the tire circumference. In other words, it is preferred that the green tire "grow" at a uniform rate under bladder pressure and that mold contact be achieved at or slightly after the instant of mold closure.

Heretofore, trial and error approaches have been taken to determine the rate of inflation desired for the green tire, and the rate of closure of the mold. Further, no tests have been derived to determine if force variation problems might be existent within a tire at the mold press stage. Force variation tests and determinations have typically been made after the tire has been completed, by running it on a force variation machine. There are no known methods or apparatus by which a determination can be made at the tire press stage as to force variation or "out of roundness" problems which might have developed within the tire. Accordingly, force variation problems imparted in the tire press stage are not detected until far down the assembly line, well after numerous tires may have experienced the same problem.

DISCLOSURE OF INVENTION

In light of the foregoing, one aspect of the invention is the provision of an apparatus and technique for measuring the growth rate of a green tire within a mold press cavity.

According to another aspect of the invention, there is provided an apparatus and technique for determining the run-out curve of a tire by measuring the green tire growth rate within a press mold.

Another aspect of the invention is the provision of an apparatus and technique for monitoring both green tire growth and mold closure rates in relationship to each other.

Still a further aspect of the invention is the provision of an apparatus and technique for altering mold closure and bladder inflation rates as a function of monitored tire-mold contact times.

Still another aspect of the invention is the provision of an apparatus and technique for measuring green tire-to-mold contact times which are simplistic in concept, reliable in operation, and accurate for providing data respecting lateral and radial force variations generated at the mold press operation.

The foregoing and other aspects of the invention which will become apparent as the detailed description proceeds are achieved by: apparatus for monitoring the rate of growth of a green tire prior to curing, comprising: first and second mold halves for receiving the green tire therebetween, said mold halves having mold sidewall surfaces and having mold rib and mold tread surfaces for imparting a tread design to the green tire; first means for closing said mold halves while expanding the green tire under pressure; and sensing means in operative communication with said mold surfaces for sensing the contact of the green tire at certain points about said mold surfaces.

Other aspects of the invention are attained by apparatus for effecting and monitoring the shaping of a green tire, comprising: first and second mold halves having mold sidewall, mold rib, and mold tread surfaces thereon for receiving the green tire; means for closing said mold halves while inflating the green tire; sensing means maintained about said sidewall and rib and tread surfaces for sensing contact of the green tire at selected points on said sidewall and rib and tread surfaces and presenting output signals corresponding to said contacts; and means receiving said output signals and determining therefrom the growth rate of the green tire within said mold halves.

BRIEF DESCRIPTION OF DRAWINGS

For a complete understanding of the objects, techniques, and structure of the invention, reference should be had to the following detailed description and accompanying drawings wherein.

BEST MODE FOR CARRYING OUT THE INVENTION

Figure 1:
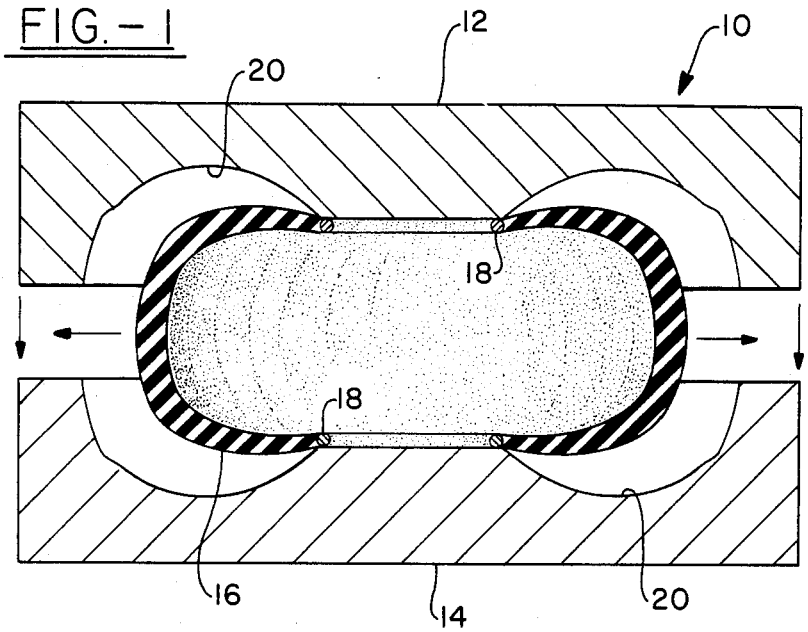
FIG. 1 is an illustrative cross-sectional view of a tire mold press receiving a green tire therein.

Referring now to the drawings and more particularly FIG. 1, it can be seen by way of background that a tire mold press is designated generally by the numeral 10. In typical fashion, the press 10 includes a top mold half 12 which, under force imparted by a motor, closes upon a bottom mold half 14. Received within the mold is a green tire 16 which is engaged with the top and bottom mold halves 12,14 at the beads 18 as illustrated. The mold press 10 includes a mold 20 for engagement with the outer circumferential portion of the green tire 16 to form a thread thereon. Of course, the press also engages the sidewalls. It will further be appreciated that the green tire 16 is urged outwardly into the mold surfaces 20 in the direction of the arrows by a bladder (not shown) inflated under controlled pressure $P_b$.

Figure 2:
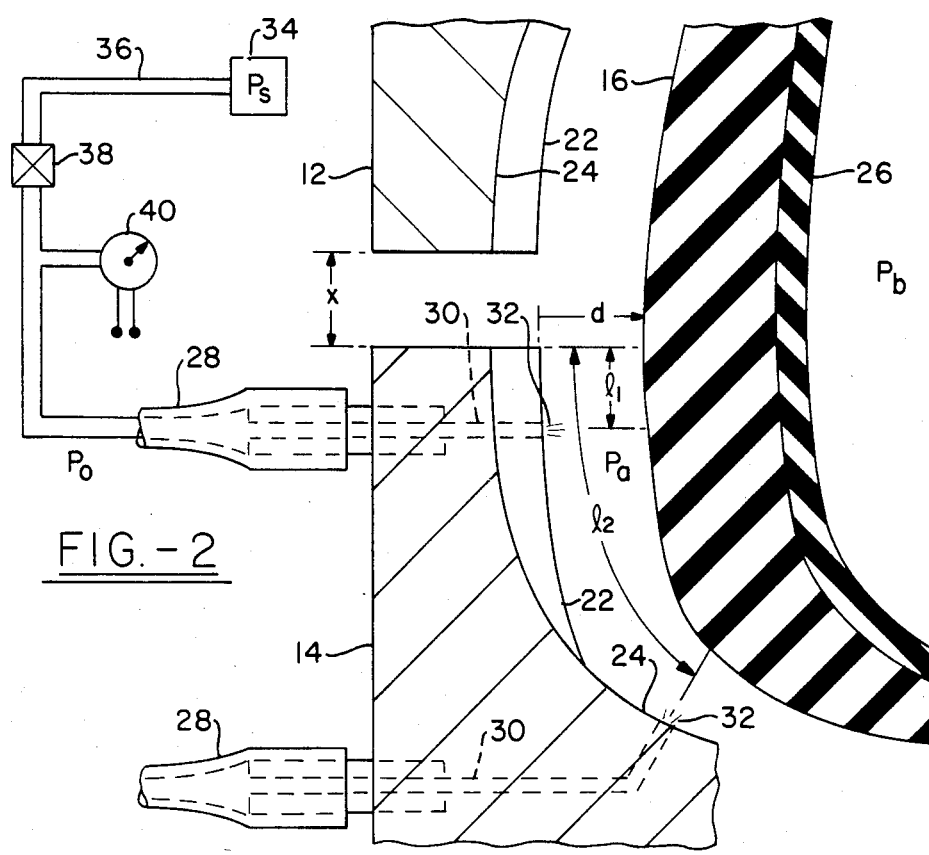
FIG. 2 is a first embodiment of the invention utilizing a pressure or vacuum source and sensors to determine mold contact.

In FIG. 2, an exploded illustrative cross-sectional view of the tire within the mold cavity is shown. As better illustrated in this Figure, the mold 20 includes mold rib top surfaces 22, and mold tread surfaces 24 for properly imparting a tread design to the green tire 16. The bladder 26 is expanded by means of bladder pressure $P_b$ into inflating engagement with the tire 16. This engagement urges the tire 16 toward the mold halves 12,14 and mold surfaces 22,24. It will be appreciated that as the tire "grows" toward the mold surfaces, the top mold half 12 is being closed upon the bottom mold half 14. Accordingly, the mold gap X, as shown in FIG. 2, decreases as the closure distance d between the tire 16 and the mold surfaces 22,24 also diminishes. Optimally, the tire 16 contacts the mold rib top surfaces 22, substantially concurrent with the closure of the mold halves 12,14.

As further illustrated in FIG. 2, a plurality of fittings 28 are provided about the mold halves 12,14 communicating through the mold surfaces 22,24 along the tread and sidewall surfaces with the mold cavity defined between the halves 12,14. The fittings 28 communicate through passages or conduits 30 with orifices 32 on the mold surfaces, each said orifice being located at some individual arcuate distance 1 from the mold separation surface as indicated. Groups of orifices all having the same arcuate distance 1 across the tread surface will later be shown to be of interest. The fittings 28 are connected to an appropriate source of air pressure 34, which passes air under pressure through a conduit 36, one-way valve or other restriction 38, through fittings 28 and passages 30, and out the orifices 32. A pressure sensor or switch 40 communicates with the conduit 36 between each orifice 32 and associated restriction 38 to emit an electrical output signal when a particular pressure is sensed or, alternatively, to produce an output signal corresponding to the particular pressure. While only one interconnection between the pressure source 34 and fitting 28 has been shown, it will be appreciated that a restriction 38 and sensor or switch 40 is uniquely interposed between each fitting 28 and pressure source 34.

With the mold halves 12,14 open, the pressure within the cavity receiving the green tire 16 is simply atmospheric pressure. Accordingly, the pressure sensor or switch 40 senses only atmospheric pressure. However, as the tire 16 grows into the mold surfaces 22,24, the orifices 32 become sealed. As each orifice 32 seals, the associated pressure sensor or switch 40 senses the supply pressure $P_s$ from the source 34, rather than atmospheric pressure. An output signal is appropriately emitted. The mold halves 12,14 may be provided with a plurality of vents to provide for the venting or passage of entrapped air once the mold halves 12,14 have closed. In any event, the plurality of pressure sensors 40, one for each of the fittings 28, emit signals corresponding to the time of contact of the green tire 16 with the associated orifice 32. As will be discussed hereinafter, this time of contact may be used to plot the run-out curve of the tire by determining the differential of expansion amounts at the various points on the tire.

As will further be discussed, the timing of the sealing or contact of the various orifices 32 may be used for controlling both bladder pressure and closure rate of the mold halves 12,14 to effect a proper relationship therebetween.

Figure 4:
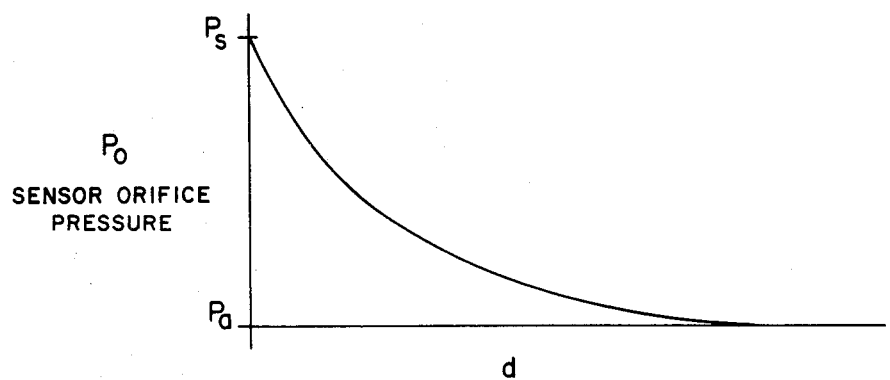
FIG. 4 is a curve illustrating the relationship between sensed pressure and closure distance between the green tire and the mold as shown in FIG. 2.

With brief reference now to FIG. 4, it can be seen that when the distance d at any point between the tire 16 and the corresponding orifice 32 is substantial, for example in excess of ½ inch, the orifice pressure $P_o$ is the atmospheric pressure $P_a$. As the bladder expands, $P_o$ approaches the supply pressure $P_s$, such that, $P_o = P_s$ when the tire has sealed the orifice 32. With the pressure sensor 40 emitting an output signal at $P_s$, there is an electrical indicia that closure has been made. Indeed, even when a pressure sensor 40 is used which emits a signal variable with pressure, a threshold sensor may be used to indicate that $P_s$ has been attained and that closure has been effected. Using such a sensor, continuous monitoring of the pressure at each of the orifices 32 may be used as a means for directly measuring the distance d, rather than calculating it from timing signals received upon sealing or contact.

Figure 3:
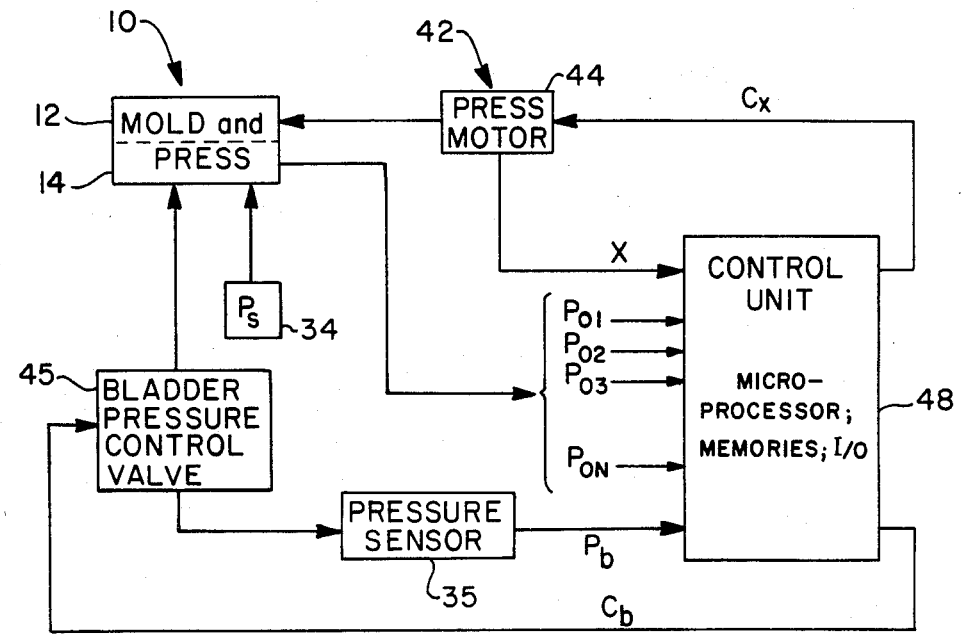
FIG. 3 is a block diagram of the control system of the invention.

Referring now to FIG. 3, it will be noted that a control system 42 may be utilized for controlling the mold press 10 and for deriving information therefrom. As illustrated, the system 42 includes a press motor 44, which would typically comprise a servo motor, for controlling the opening and closing of the old halves 12,14. A source of steam pressure (not shown) as modulated by a bladder pressure control valve 45 is used to control inflation of the bladder 26, as discussed hereinabove. The basic control unit of the system 42 comprises a microprocessor 48 which, in standard fashion, includes memories such as RAMs and ROMs, as well as input/output ports. As data inputs to the microprocessor 48 are the N orifice pressure signals from the pressure sensor switches 40 associated with the fittings 28. Also provided as data to the microprocessor 48 is the closure position x of the mold press halves 12,14 as determined by a reading from an appropriate resolver on the press motor and gear train 44. Another data input to the microprocessor via an appropriate pressure sensor comprises the bladder pressure $P_b$.

In utilizing the structure of FIGS. 1-3, presented above, it will be appreciated that the microprocessor 48 can record the instant in time at which each of the N orifices 32 are closed or sealed by the green tire 16, such contact being indicated by one of the signals $P_{O1}$ through $P_{ON}$. With the first contact establishing an initial time $t_0$, this reference time may be used as a starting point to calculate for all other orifices 32 their incremental time of contact, thus providing a growth differential relationship among all of the orifices 32. In other words, for any orifice i, the incremental time after $t_0$ required for the growth of the tire at that point to achieve closure is defined by $\Delta t_i = t_i - t_0$. Of course, this calculation could be obtained for all orifices 32 from i=1 to N.

In one preferred implementation of the invention, a sub group of N' orifices 32, where N'≦N, will be established, all having a specific arcuate distance 1 not far from the mold separation surface and located on the mold rib top surfaces 22 as indicated in FIG. 2. Knowing the incremental time differential for sealing of each of the orifices 32 having the same arcuate distance 1, a calculation may be made of the radial deviation of each point of the tire associated with the N' orifices 32 at the time of first contact $t_0$ as follows: $\Delta r_i(t_0) = \Delta t_i \cdot S_r$ where $S_r$ is the average speed of radial expansion of the tire. It will be appreciated that, knowing the bladder pressure $P_b$, this average speed of radial expansion may be determined empirically or experimentally.

Knowing the radial deviation of these N' points on the tire relative to the first contact point at time $t_0$, one may derive the radial run-out profile of the green tire by curve-fitting to the N values of $\Delta r_i(t_0)$. Of course, the radial run-out profile would take into account the relative circumferential arcuate spacing of the N' points about the tire. Further, since the radial run-out profile of a green tire is known to generally correlate that of the resulting cured tire, particularly for radial tires, the run-out profile so determined may be used to anticipate problems with the cured tires if corrective action is not taken.

The above technique for deriving the radial run-out profile of the green tire is predicted on several assumptions. First, it is assumed that the N' sensing points in the mold all fall on the same mold radius R. If they are not on the same radius, compensating corrections must obviously be made. Secondly, it is assumed that the radial speed of expansion of the tire at other sensing points is not grossly influenced by the tire already having approached or made contact at certain of the points. Finally, it is assumed that the radial speed of expansion in the absence of influence by the sensors is substantially constant at all N' points and during the time of movement corresponding to maximum differential run-out. Obviously, it is preferred that the sensors, such as the orifices 32, provide little, if any, obstruction to the expansion of the tire within the mold cavity since that may influence the timing of the other sensors. Should sensing elements provide obstruction of a measurable amount, compensating calculations on each associated $\Delta r_i$ must be entertained.

Having determined the radial deviation $\Delta r_i(t_0)$ for each of the points of interest on a tire, one may then determine the average tire radius at time $t_0$ according to the following: $\Delta r_a(t_0) = (1/N')\Sigma \Delta r_i(t_0)$. The average tire radius at time $t_0$ is then $r_a(t_0) = R - \Delta r_a(t_0)$, where R is the mold radius.

The average gap $G_a$ between the mold and the tire at time $t_0$ is the same as $\Delta r_a(t_0)$ since at that instant, the first point of the tire is just touching the mold and the $\Delta r_i$ values for all other points are actually gap values between the tire and the mold. Thus, $G_a(t_0) = \Delta r_a(t_0)$.

As discussed above, it is desired that the tire 16 engage the mold surface 20 at substantially the same time as the mold halves 12,14 close. Assuming that the mold halves 12,14 close at time $t_m$, there is a particular value $G_d$ of gap desired at that time between the tire and the mold. To calculate the actual average gap at time $t_m$: $G_a(t_m) = G_a(t_0) - S_r(t_m - t_0) = \Delta r_a(t_0) - S_r(t_m - t_0)$.

The deviation or error of the actual average gap between the tire and the mold from the desired gap at the time of mold closure is defined as $\Delta G_c = G_d(t_m) - G_a(t_m)$.

To obtain optimum tire-to-mold contact time with relationship to mold closure time, the deviation $\Delta G_c$ of the actual gap from the desired gap may be used to obtain a correction in either bladder pressure $P_b$, or in mold closing time $t_m$, or both, for subsequent tires. Since the growth rate of the tire is a function of bladder pressure $P_b$, correction of mold contact time may be readily obtained by changing the bladder pressure by the amount $\Delta P_b$, where $\Delta P_b = K \cdot \Delta G_e$. The value of K, a constant, would depend upon the knowledge of the behavior of the tire growth rate as a function of pressure and may be readily derived by experiment for different tire types.

It will be appreciated that the control discussed directly above can be readily achieved utilizing the structure of FIG. 3. The correction in bladder pressure $P_b$ may readily be obtained via program control of the microprocessor 48 to effect a change in the pressure control signal $C_b$. Similarly, should a change in the rate of closure of the mold press 10 be desired, appropriate control of the press motor 44 may be obtained via motor control signal $C_x$. Obviously, the determination of radial deviation, average radial deviation, average gap deviation, and other calculations necessary for achieving the technique described above may be readily calculated via the microprocessor 48, based on the closures of the various orifices 32 as evidenced by signals $P_{O1} - P_{ON}$.

Figure 5:
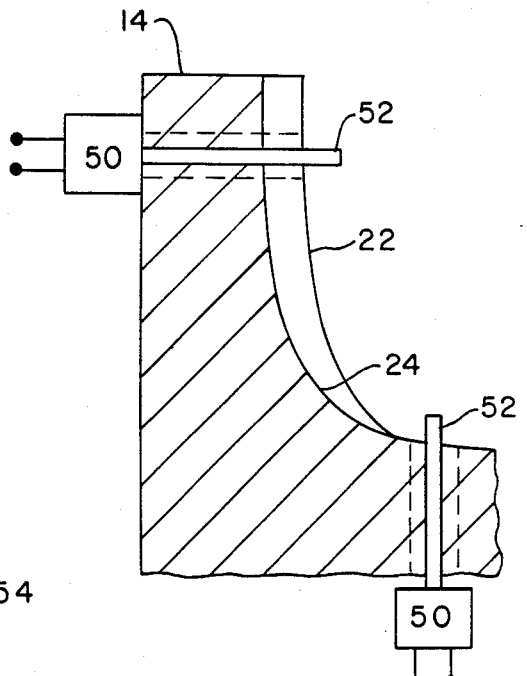
FIG. 5 is an illustrative view of a mold receiving linear variable differential transformers as the sensing units.

It will further be appreciated that sensors other than the pressure sensors or switches 40 might be utilized. For example, the fittings 28 might be connected to a vacuum source rather than a pressure source, with the switch 40 sensing the existence of vacuum rather than pressure. With reference to FIG. 5, it can be seen that the sensors may comprise linear variable differential transformers (LVDTs) 50, each having a shaft 52 extending into the mold cavity. As is well known in the art, the output of the LVDTs 50 will correspond to the position of the shaft 52, which positioning effects the coupling of the transformers of the LVDTs 50. Accordingly, the output of each LVDT 50 is an electrical signal corresponding to the extension of the shaft 52, which positioning also will indicate the positioning of the green tire 16. Of course, a calibrated threshold output of the LVDT 50 can be established as the point at which mold contact has been made by the tire 16.

Figure 6:
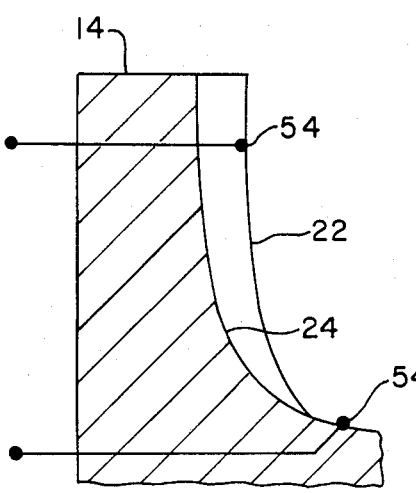
FIG. 6 is an illustrative view of a mold receiving thermal sensors as the sensing units.

As illustrated in FIG. 6, thermocouples 54 are provided within the mold surfaces 22,24. With the green tire being at a lower relative temperature, when the tire touches the thermocouple 54 or other appropriate thermal sensor, an output is emitted. By sensing these outputs, closure of the green tire against the mold can be sensed in substantially the same manner as discussed hereinabove with respect to FIG. 2.

Figure 7:
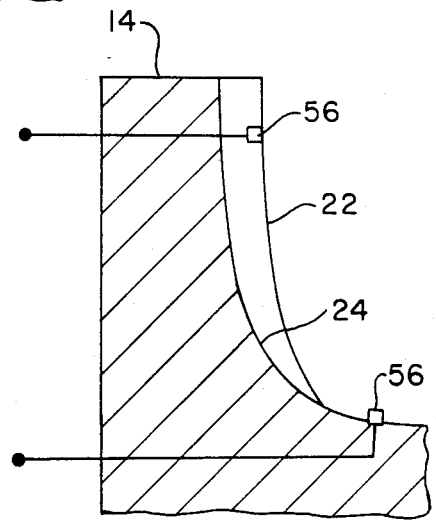
FIG. 7 is an illustrative view of a mold receiving microswitches as the sensing units.

As illustrated in FIG. 7, microswitches 56 may be positioned about the N points of the mold surfaces 22,24. As the green tire 16 expands, contact with the microswitches 56 will emit appropriate electrical signals for sensing by the microprocessor 48.

It will be apparent to those skilled in the art that capacitive sensors, resistive sensors, and various other type sensors might be utilized in place of those presented hereinabove. Suffice it to say that, in accordance with the teachings of the invention, appropriate sensors are positioned about the mold surfaces 22,24 for determining tire-to-mold contact or proximity times. From those sensings, data may be derived as to both lateral and radial run-out profile, gap deviations, and the like as discussed hereinabove. Rapid correction of determined errors is thus readily attained in an on-line mode.

Thus it can be seen that the objects of the invention have been satisfied by the structure and technique presented hereinbove. While in accordance with the patent statutes only the best mode and preferred embodiments of the invention have been presented and described in detail, it will be understood that the invention is not limited thereto or thereby. Accordingly, for an appreciation of the true scope and breadth of the invention, reference should be had to the appended claims.

What is claimed is:

1. Apparatus for monitoring the rate of growth of a tire prior to curing, comprising:
    first and second mold halves for receiving the tire therebetween, said mold halves having mold sidewall surfaces, and mold rib and mold tread surfaces for imparting a tread design to the tire;
    first means for closing said mold halves while expanding the tire under pressure;
    sensing means in operative communication with certain of said mold surfaces for sensing the approach or contact of the tire at certain points about said mold surfaces; and
    control means interconnected between said sensing means and said first means for regulating the rate of closure of said mold halves as a function of the times of contact of the tire at said certain points.

2. Apparatus according to claim 1 wherein said sensing means comprise a vacuum source communicating through orifices in said mold surfaces and wherein each said orifice has its own vacuum sensor associated therewith.

3. Apparatus according to claim 1 wherein said control means further regulates the rate of expansion of said tire as a function of the times of contact of the tire at said certain points.

4. Apparatus according to claim 1 wherein said sensing means comprises a source of air pressure communicating with the tire through orifices within said mold surfaces.

5. Apparatus according to claim 1 wherein said sensing means comprise microswitches positioned about said mold surfaces.

6. Apparatus according to claim 1 wherein said sensing means comprise linear variable differential transformers, presenting output signal corresponding to the proximity of the tire to said mold surfaces.

7. Apparatus according to claim 1 wherein said sensing means comprise thermal responsive means positioned about said mold surfaces for emitting output signals corresponding to the temperature of said thermal responsive means.

8. Apparatus according to claim 7 wherein said thermal responsive means comprise thermocouples.

9. Apparatus according to claim 1 wherein said sensing means determines the growth of the tire within said mold by monitoring the times of contact of the tire at said certain points about said mold surfaces.

10. Apparatus according to claim 9 wherein said sensing means further determines the radial deviation of the tire at each of said certain points of contact of the tire with said mold surfaces.

11. Apparatus according to claim 10 wherein said sensing means further determines the average gap existing between the tire and said mold surfaces at the time of contact of the tire with a first of said certain points about said mold surfaces.

12. Apparatus for effecting and monitoring the curing of a tire, comprising:
    first and second mold halves having mold sidewall, mold rib, and mold tread surfaces thereon for receiving the tire;
    means for closing said mold halves while inflating the tire;
    sensing means maintained about said sidewall, rib, and tread surfaces for sensing contact of the tire at selected points on said sidewall, rib, and tread surfaces and presenting output signals corresponding to said contacts;
    means receiving said output signals and determining therefrom the growth of the tire within said mold halves; and
    means receiving said output signals and determining therefrom the lateral and radial runout profile of the green tire.

13. Apparatus according to claim 12 which further includes control means interconnected between said sensing means and said means for closing said mold halves, said control means receiving said output signals and regulating the rate of closure of said mold halves as a function thereof.

14. Apparatus according to claim 13 wherein said control means further regulate the rate of inflation of the tire as a function of said output signals.

15. Apparatus according to claim 12 which further includes means receiving said output signals and determining therefrom the lateral and radial runout profile of the green tire.

16. Apparatus according to claim 12 which further includes means receiving said output signals for determining the average gap of the tire from said mold surfaces at the time of contact of the tire at one of said preselected points.

17. Apparatus according to claim 12 which further includes means for determining the spacing of said mold halves from closure at the time of contact of the tire at said selected points.

* * * * *